United States Patent [19]
Gittenait

[11] 3,713,802
[45] Jan 30, 1973

[54] REACTION OF PHOSPHORIC ACID, UREA, AND AMMONIA

[75] Inventor: Marcel Gittenait, Colombes, France

[73] Assignee: Societe Anonyme: Ugine Kuhlmann, Paris, France

[22] Filed: Dec. 28, 1970

[21] Appl. No.: 101,962

[30] Foreign Application Priority Data

Jan. 9, 1970 France..................................7000806
July 7, 1970 France..................................7025133

[52] U.S. Cl. ............................71/29, 23/107, 71/35
[51] Int. Cl. ................................................C05b 7/00
[58] Field of Search.......71/29, 34, 35, 43; 23/106 A, 23/107

[56] References Cited

UNITED STATES PATENTS

| | | | |
|---|---|---|---|
| 3,397,035 | 8/1968 | Yu Shen et al. | 23/106 |
| 3,540,874 | 11/1970 | Stinson | 71/29 |
| 3,419,349 | 12/1968 | Rohlfs et al. | 73/107 R |
| 3,333,921 | 8/1967 | Krellmueller | 23/106 |
| 3,495,937 | 2/1970 | Yu Shen et al. | 23/106 |
| 3,586,495 | 6/1971 | Bauwens et al. | 71/29 |

FOREIGN PATENTS OR APPLICATIONS 1,149,924   4/1969   Great Britain............................71/29

Primary Examiner—Reuben Friedman
Assistant Examiner—Richard Barnes
Attorney—Hammond & Littell

[57] ABSTRACT

A process for obtaining, in the same manufacturing process, two different fertilizers, namely a solid or liquid fertilizer which is based on ammonium and urea polyphosphate and the solutions of which are clear and stable over a period of time, and a solid binary fertilizer (N,P) or solid ternary fertilizer (N, P, K) which is very concentrated and based on ammonium-urea phosphate.

The process of the invention makes use of the action of ammoniation and condensation of urea phosphate, because owing to its mode of formation this compound gives rise to a separation of the impurities of wet process orthophosphoric acid, e.g., iron, aluminum, calcium, magnesia and fluorine, which remain in the mother liquors from centrifugation of the urea phosphate crystals.

According to a preferred embodiment of the invention a reaction product is obtained which is constituted mainly of ammonium pyrophosphate. The non-ortho $P_2O_5$/ total $P_2O_5$ ratio of the product obtained is generally from 50 to 70 percent, but such high values as 92–98 percent have also been obtained in certain embodiments according to the invention.

The process of the invention combines the chemical reactions between phosphoric acid, urea, and ammonia in such a manner that the overall thermal balance provides an excess, thus making it possible to operate under autothermal conditions.

14 Claims, 1 Drawing Figure

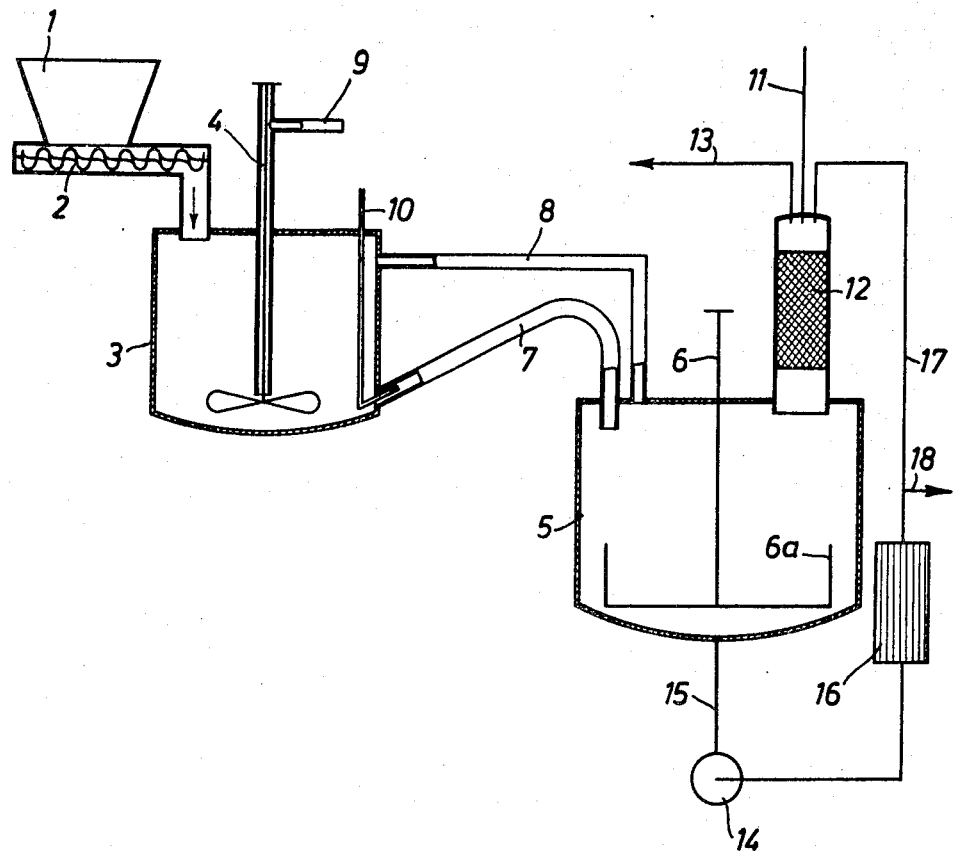

REACTION OF PHOSPHORIC ACID, UREA, AND AMMONIA

The present invention has as object a process for the obtaining of new reaction products of wet process phosphoric acid, urea, and ammonia. It relates more particularly to the manufacture of solid and/or liquid fertilizers based on ammonium and urea polyphosphates by a process which can be carried out under autothermic conditions and which in addition makes it possible to obtain, in the same manufacturing process, solid binary or ternary fertilizer based on ammonium and urea phosphate.

The invention relates more particularly to the liquid and solid fertilizers obtained by the process described, which have high contents of fertilizing elements and which, when presented in solid form, may be utilized in that form by spreading or, after dissolving, in water, by spraying, injection, sprinkling, or dilution in the same manners as liquid fertilizers.

The manufacture of solid fertilizers capable of being formed into solutions or suspensions is known.

As a document illustrating the prior art in this field mention may be made of French Pat. No. 1,519,801, which describes fertilizers in suspension form obtained by adding water to solid fertilizers based on ammonium phosphate, urea, and potassium chloride.

It is found necessary to be able to offer users not only fertilizers in suspension form but also liquid fertilizers which have a high a concentration as that of fertilizers in suspension form, for example those described in French Pat. No. 1,519,801, and which are nevertheless limpid and stable over a period of time.

In this connection it is known that fertilizers based on ammonium polyphosphate are more soluble in water than fertilizers based on ammonium orthophosphate and that consequently they are more suitable for liquid formulations.

Numerous documents exist which illustrate the prior art in connection with the manufacture of ammonium polyphosphates. For the most part these relate to processes employing thermal treatment of the products of ammoniation of orthophosphoric acid produced by the furnace or wet processes, the neutralization of polyphosphoric acids by ammonia, or else the thermal condensation of mono-and/or di-ammonium phosphates.

Other previous documents relate to processes for the manufacture of ammonium polyphosphate by thermal treatment of ammoniated phosphoric acid ro mono- and/or di-ammonium phosphates with urea, which serves as condensation agent.

French Pat. Nos. 1,533,272 and 1,575,795, for example, relate to processes utilizing the last-mentioned technique but necessitating previous partial purification of the orthophosphoric acid used; in addition although the process described in French Pat. No. 1,533,272, is autothermal, the process corresponding to French Pat. No. 1,575,795 requires heat to be supplied from an external source.

British Pat. No. 1,149,924 describes for the production of crystallized urea phosphate by reacting urea and phosphoric acid. French Pat. No. 1,481,286 also relates to a process for the production of an ammonium polyphosphate by neutralizing phosphoric acid with urea. In order to illustrate the prior art still further, mention may be made of U.S. Pat. No. 3,022,153 which proposes the direct use of wet process phosphoric acid, urea, and ammonia, with the conversion of the phosphoric acid into urea phosphate and subsequent ammoniation of the latter. U.S. Pat. No. 3,022,153 proposes more specifically the complexing by means of glycerin of phosphates which are insoluble in the liquid reaction medium, and the subsequent addition of an amine to the reaction product in order to obtain good keeping properties.

French Pat. Nos. 1,411,254, 1,461,027, and 1,471,510 describe the use of urea and also urea phosphate as condensation and ammoniation agents for the purpose of producing more or less water-soluble ammonium polyphosphates which are intended more particularly for use as inflammation inhibitors for plastics materials, textiles, and paints. The thermal condensation is effected either at temperatures between 170°C and 260°C or at temperatures between 200° and 300°C in the presence of an additive composed of an ammonium polyphosphate having a clearly determined crystalline form, or else at temperatures between 100° and 350°C in an atmosphere controlled for ammonia vapor and water vapor pressure, in order to obtain a polyphosphate possessing previously selected solubility in water. All these processes for the manufacture of ammonium polyphosphate require very considerable consumption of heat to enable them to be carried out.

The same is true of the processes described in French Pat. No. 1,437,486 and German Pat. Nos. 1,216,856 and 1,228,593 which likewise use urea and urea phosphate as condensation agents in the preparation of chain polyphosphates applying thermal conditions between 110°C and 400°C, but with a very long heating time, amounting, to from 2 to 3 hours.

Among all the processes described in the earlier patents mentioned above, those which do not have the particular object of producing ammonium polyphosphates for the manufacture of liquid fertilizers do not specify the previous purification of the raw materials. This operation, which is mentioned in French Pat. Nos. 1,533,272 and 1,575,795 is nevertheless necessary since otherwise the liquors obtained are not stable over a period of time, and an insoluble product is formed which in the course of time is deposited in the storage vessels. It is therefore desirable to develop a process which makes it possible to obtain ammonium polyphosphates suitable for the manufacture of fertilizers and which eliminates the need for previous purification of the raw materials, particularly phosphoric acid.

The invention has as its first object a process for the obtaining of products based on ammonium-urea polyphosphate which can be carried out without supplying heat, under autothermal conditions.

The invention also has as object a process for the manufacture of fertilizers based on ammonium polyphosphates which provide the advantage over orthophosphates of being more soluble, so that they provide highly concentrated liquid fertilizers, and of possessing a complexing power in relation to Fe, Al, Ca, Mg and certain other ions so as to provide clear solutions which will keep.

The invention has yet as another object a process for obtaining solid fertilizers or liquid fertilizers which are clear and stable over a period of time, based on ammonium-urea polyphosphate, utilizing, as starting raw materials, wet process phosphoric acid in the form in which it leaves the factory, concentrated or otherwise, that is to say with a $P_2O_5$ content of from 30 to 60 percent, in solid or concentrated solution form, and liquid or gaseous ammonia.

The invention has as a further object a process in which use is made of the crystallization of the urea phosphate produced by contacting phosphoric acid with urea, with the separation of impurities such as iron, aluminum, calcium, fluorine and magnesium which remain in the mother liquors from the crystals centrifugation.

The invention has as a further object a process in which the mother liquors remaining from the crystallization of the urea phosphate and containing all the impurities originating from the phosphatic rock (Fe, Al, Ca, Mg, F, etc.) are likewise converted into a concentrated binary or ternary fertilizer based on ammonium-urea phosphate.

The invention has as another object a process for obtaining, in the same manufacturing process, two different fertilizers, namely a solid or liquid fertilizer which is based on ammonium and urea polyphosphate and the solutions of which are clear and stable over a period of time, and a solid binary fertilizer (N,P) or solid ternary fertilizer (N,P,K) which is very concentrated and based on ammonium-urea phosphate. The invention has a yet another object a process for obtaining stable liquid fertilizers in which the weight ratio of the fertilizer components $N:P_2O_5$ is higher than 0.5 and in particular is between 0.52 and 0.55. The invention likewise has as object a process for the production of stable liquid fertilizers in which the weight ratio of the fertilizer components $N:P_2O_5$ is lower than 0.5 and in particular is between 0.43 and 0.49.

The invention has as another object a possess in which the starting material is a non-concentrated wet process phosphoric acid and in which an ammonium polyphosphate based fertilizer is obtained with a low degree of condensation (principally ammonium pyrophosphate), this fertilizer consequently being highly soluble in water.

The invention therefore relates to a process for obtaining new reaction products of phosphoric acid, urea, and ammonia by converting phosphoric acid into urea phosphate and subsequent ammoniation of the latter, said process being characterized in that (1) the urea and the unpurified wet process phosphoric acid, titrating at 30–60 percent $P_2O_5$, are directly reacted, thereby obtaining a urea phosphate which crystallizes and a solution which contains practically all the mineral impurities of the phosphoric acid and which can be utilized in a subsequent operation, and (2) at least one treatment of said urea phosphate with ammonia is effected, at a pressure at least equal to atmospheric pressure, thus finally obtaining an ammoniated polyphosphate product having a low degree of condensation and consisting of an ammonium polyphosphate the non-ortho $P_2O_5$ content of which constitutes at least 50 percent of its total $P_2O_5$ content, the combination of the reactions carried out in stages (1) and (2) leading to an overall excess of heat and operation under autothermic conditions.

The process of the invention makes use of the action of ammoniation and condensation of urea phosphate, because owing to its mode of formation this compound gives rise to a separation of the impurities of wet process orthophosphoric acid, e.g. iron, aluminum, calcium, magnesia and fluorine, which remain in the mother liquors form centrifugation of the urea phosphate crystals.

According to a preferred embodiment of the invention a reaction product is obtained which is constituted mainly of ammonium pyrophosphate. The non-ortho $P_2O_5/$ total $P_2O_5$ ratio of the product obtained is generally from 50 to 70 percent, but such high values as 92–98 percent have also been obtained in certain embodiments according to the invention.

The process of the invention combines the chemical reactions between phosphoric acid, urea, and ammonia in such a manner that the overall thermal balance provides an excess, thus making it possible to operate under authothermal conditions.

It is known that urea phosphate is an addition compound which in chemical reactions behaves like a mixture of phosphoric acid and urea. When this product is ammoniated, depending on the degree of ammoniation and the temperature at which the operation is carried out, the following reactions may occur partially or totally:

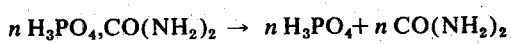

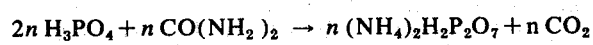

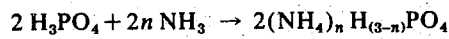

The reactions of ammoniation of ortho- and pyrophosphoric acids are highly exothermic, while the reactions of decomposition of urea and polymerization of the phosphate molecule are endothermic.

According to the teaching of the invention, the overall calorific balance of the process is positive when the reaction is limited to the less condensed forms of ammonium polyphosphate and essentially to ammonium pyrophosphate.

The process of the invention is very suitable for continuous operation and it will be illustrated below with reference to the accompanying drawing, which illustrates diagrammatically an apparatus for the continuous manufacture of liquid fertilizer by ammoniation of urea phosphate. It is nevertheless obvious that the process may be carried out discontinuously, even in a single vessel.

Before illustrating the invention by detailed examples of its performance, some general information will be given regarding a mode of performance which may advantageously be used in practice.

Wet process phosphoric acid, with a concentration between 30 and 60 percent $P_2O_5$, and urea in the solid state or in the form of a concentrated solution, coming from a factory producing urea, is introduced into a vessel provided with an agitation device. After agitating for a short period, the urea phosphate crystallizes and it is separated by centrifugation from the residual mother liquors, which retain the impurities of the wet process phosphoric acid.

The urea phosphate is then introduced into a container in which it is ammoniated at atmospheric pressure or under a higher pressure until the product passes from the solid to the liquid state through the action of the heat released by the partial neutralization of the phosphoric acid. The product becomes pasty at 80°C and liquid at 85-90°C, whereas the melting temperature of non-ammoniated urea phosphate prepared from wet process phosphoric acid is 113°C.

The ammoniated liquid product is the introduced into below. reaction tube of small diameter, at the inlet of which it undergoes supplementary ammoniation by means of an ammonia injector. Inside this tube the reactions of decomposition of urea, condensation of the phosphate molecule, and neutralization of the ortho- and polyphosphoric acids take place. The temperature of the products which is 110°C on entering the reaction tube, rises to 155°C at the outlet. The product obtained has a frothy appearance and, depending on whether it is intended for the production of solid fertilizer or the production of liquid fertilizer, it is treated differently as described below, In the case of the manufacture of a solid fertilizer, the product is vigorously kneaded before being introduced into a granulation plant, so as to assist the crystallization of the polyphosphate and the obtaining of hard granules.

The product obtained is a mixture of ammonium orthophosphate, ammonium polyphosphate, and urea, and has a total $P_2O_5$ content of 45-47 percent, of which 53-67 percent are in polyphosphoric form, and a total N content of 23-25 percent, of which 10.5-15 percent is ammoniacal nitrogen.

The amount of decomposed urea, which serves as condensation and ammoniation agent, is usually from 40 to 45 percent of the urea used.

During granulation it is possible to add other fertilizing materials, such as for example additional urea in order to obtain a binary fertilizer titrating at 30 percent N, 30 percent $P_2O_5$, or else potassium chloride in order to obtain a ternary fertilizer titrating at 20 percent N, 20 percent $P_2O_5$, 20 percent $K_2O$.

When the product is intended for the manufacture of liquid fertilizers, the foams leaving the reaction tube are collected in a dissolution vessel, to which the water necessary to obtain the desired titre is added.

The liquid fertilizer is cooled by passing through a cooler and recycled to the dissolution vessel so as to maintain a temperature of 50°-60°C in the latter. Liquid fertilizers titrating at 15-17 percent N and 27-31 percent $P_2O_5$ can be obtained in this manner. In the practical performance of a process of this kind the weight ratio $N:P_2O_5$ generally varies between 0.52 and 0.55 in the liquors obtained.

For certain fertilizing treatments it is desirable to have available liquid fertilizers in which the $N:P_2O_5$ weight ratio is lower than 0.5 and more particularly between 0.43 and 0.49.

According to a first means, the reduction of the $N:P_2O_5$ weight ratio in the urea-ammonium-polyphosphate liquors treated may be effected by additionally introducing wet process phosphoric acid into said liquors.

The required proportion of wet process phosphoric acid may be introduced in this way into the urea phosphate undergoing ammoniation and condensation and/or into the zone of dissolution of the urea-ammonium-polyphosphate foams leaving the reaction zone. If desired, the $N:P_2O_5$ ratio of the liquor may be further adjusted by introducing a small additional amount of ammonia. In this embodiment of the invention it is sufficient to provide simply an additional connection for the introduction of wet process phosphoric acid into the actual ammoniation zone and/or into the dissolution zone.

By this means there have thus been obtained urea-ammonium polyphosphate liquors having a content of 14-14.6 percent by weight of nitrogen and 29.8-30 percent by weight of $P_2O_5$.

According to another means, which may be used to replace or to supplement the addition of wet process phosphoric acid, the liquors obtained by the process of the invention are cooled; suitable cooling temperatures may be lower than -5°C and particularly/of the order of $-10°$ to $-15°C$.

The $N:P_2O_5$ ratio may in fact be lowered to a value below 0.50 by removing ureic nitrogen from the urea-ammonium polyphosphate liquor obtained by the process of the invention, by cooling to a temperature of the order $-10°$ to $-15°C$. Urea crystals are formed which, after separation by centrifugation, leave an urea-ammonium polyphosphate liquor containing by weight 13.6-14 percent N and 31-32% $P_2O_5$.

This liquor is perfectly clear and almost colorless while the urea crystals separated may be reused for production purposes.

These liquid fertilizers are better balanced from the point of view of distribution of fertilizing elements than the solutions based on polyphosphates which are at present marketed. Oligo elements or insecticides may also be introduced into these liquid fertilizers, in order to carry out mixed agricultural treatments when desired.

The mother liquors obtained on the separation of the urea phosphate crystals are solutions which are saturated at the centrifugation temperature. They contain all the impurities originating from the wet process phosphoric acid and have a water content which, depending on the centrifugation temperature, varies, for example, from 27 to 45 percent if centrifugation is effected at temperatures between 50° and 18°C. Depending on their water content, these mother liquors are either ammoniated directly or ammoniated after concentration and then introduced into a conventional granulation installation for the production of a binary urea-ammonium phosphate fertilizer or, after addition of other ingredients, of a highly concentrated ternary fertilizer.

It is thus possible to obtain a binary fertilizer titrating at 24.77% N, 36.82% $P_2O_5$ and, after potassium chloride, a ternary fertilizer titrating at 19% B, 19% $P_2O_5$, 19% $K_2O$, as will be illustrated below by Example 1.

The relative proportion of the two grades of fertilizer, namely solid of liquid fertilizer based on urea-ammonium polyphosphate and solid fertilizer based on urea-ammonium phosphate obtained in the same manufacturing cycle, depends on the water content of the starting phosphoric acid, where applicable that of the urea when the latter is introduced in the form of a solution and on the temperature at which the crystallized urea phosphate is centrifugated. These various factors can thus be utilized to adjust the relative quantities of fertilizers which can be obtained by the process.

The performance of the process of the invention will now be illustrated, without limiting it in any way, by the following examples.

EXAMPLE 1

One-hundred-sixty-five kg of phosphoric acid containing 53.5% $P_2O_5$ (originating from a wet process phosphoric acid factory) and 74.50 kg of urea containing 46% N are introduced into a vessel equipped with an agitation device.

The temperature of the acid, which was originally from 40° to 43°C, drops by a few degrees after the introduction of the urea and then rises to about 60°C in proportion to the formation of urea phosphate crystals.

The reaction is very rapid and after agitation for 1 hour the crystals formed are centrifugated and washed in a centrifuge.

The temperature at which the centrifugation is effected is 50°C.

One-hundred-one kg of slightly wet urea phosphate crystals and 138 kg of mother liquors are obtained.

The crystallized urea phosphate titrates at 44% $P_2O_5$ and 17.4% N. The mother liquors titrate at 31.5% $P_2O_5$ and 12.2% N, and contain all the impurities introduced by the wet process phosphoric acid used.

The crystallized urea phosphate is introduced into an apparatus which is diagrammatically illustrated in the accompanying drawing and which will now be described.

The apparatus comprises a charging hopper 1 for the urea phosphate. A worm 2 at the foot of the hopper enables the urea phosphate to be introduced continuously into an ammoniation vessel 3 equipped with an agitator 4. The vessel 3 is in communication with another, cylindrical container 5, equipped with an agitator 6, through a reaction tube 7 of small section. An overflow pipe 8 also connects the top part of the vessel 3 to the vessel 5.

The agitation device 4, of the first vessel 3, into which the crystallized phosphate is introduced, is hollow in order to permit the introduction of gaseous ammonia through the connection 9.

A second introduction of ammonia is effected through an injector 10 discharging into the inlet of the reaction tube 7. The other end of said tube 7 penetrates into the top portion of the second vessel 5, the agitation device 6 of which is equipped with blades 6a having a special profile for heating foams.

The entire apparatus is heat-insulated when it is desired to manufacture a very solid urea-ammonium polyphosphate.

When it is desired to obtain a liquid fertilizer directly, the second vessel 5 is a dissolution vessel provided with a water inlet (pipe) 11, a small column 12 for absorbing the gases released, optionally an inlet for ammonia to regulate the pH, a connection 13 for the discharge of gases, and a recycling pump 14. The recycling pump 14 continuously withdraws liquid fertilizer at the bottom of the vessel 5 through the pipe 15 and returns it to the top of the vessel through the pipe 17 after having passed it through an external cooler 16 and the small gas absorption column 12. The product, i.e., liquid fertilizer, is taken from the circuit through the pipe 18 to be delivered to storage.

This apparatus is started up by introducing into the ammoniation vessel 3 urea phosphate coming from a previous operation and gaseous ammonia so as to form a liquid starting layer at the temperature of 85°-90°C. When it is considered that the height of the starting layer is sufficient, the temperature is allowed to rise to 110°C and the apparatus is then ready for continuous operation.

The 101 kg of centrifugated phosphate previously obtained are introduced by utilizing a suitable continuous distributor with a flow regulated by the temperature in the liquid mass, this temperature being kept at about 110°C because of the exothermic ammoniation reaction.

At the same time, gaseous ammonia is introduced both through the hollow agitation device 4 of the ammoniation vessel 3 and through the ammonia injector 10 situated at the inlet of the reaction tube 7. At the outlet of said tube the product flows at a temperature of 155°C into the second vessel 5. The temperatures are kept stable at 110°C in the ammoniation vessel 3 and at 155°C at the outlet of the reaction tube 7 throughout the entire operation.

A total of 9.5 kg of gaseous ammonia is introduced and 97 kg of urea-ammonium polyphosphate are obtained, which after cooling titrates as follows:
total $P_2O_5$ : 45.67%
pyro $P_2O_5$ : 30.58%
ortho $P_2O_5$ : 14.81%
total N : 24.80%
ammoniacal N : 14.94%
ureic N : 9.86%

This product may be granulated in the condition in which it is produced, applying the various conventional granulation techniques such as those already describe in connection with the granulation of solid polyphosphates.

The urea-ammonium polyphosphate leaving the reaction tube 7 may also be immediately dissolved by adding the amount of water necessary for obtaining a liquid fertilizer. Thus, by adding 53 kg of water to the dissolution vessel 5 there are obtained 150 kg of liquid fertilizer titrating at 16.5% N and 30% $P_2O_5$.

In cold weather and for storage over a long period of time it is preferable to increase the amount of water to 68 kg in order to obtain 165 kg of liquid fertilizer titrating at 15% N and 27% $P_2O_5$.

The mother liquors, amounting to 138 kg, originating from the centrifugation of the urea phosphate are ammoniated with 15 kg of gaseous ammonia. A past having a temperature of 115°C is obtained which contains between 15 and 17 percent water depending on the speed at which the ammoniation is conducted.

The paste is delivered to a conventional granulation installation in which a recycling rate of the order of twice the weight of marketable product is maintained.

One-hundred-seventeen kg of granulated binary fertilizer are thus obtained with the following titration:
total N : 24.77% ureic N : 12.82%
ammoniacal N : 11.95%
total $P_2O_5$: 36.82%
water soluble $P_2O_5$
+ citrate : 36.16%
water soluble $P_2O_5$ : 34.96%
humidity : 1.76%

As an alternative, urea and potassium chloride were also added during the granulation and a ternary fertilizer was obtained which contained 19% N, 19% $P_2O_5$, and 19% $K_2O$.

EXAMPLE 2

107.5 kg of wet process phosphoric acid containing 52.3% $P_2O_5$ and 181 kg of recycled mother liquors coming from a previous operation of centrifugation urea phosphate crystals, at a temperature of 18°C, are introduced into a vessel equipped with an agitation device. The mother liquors have a $P_2O_5$ content of 21.47 percent and contain 8.82 percent of ureic N.

After homogenization by agitation of the mixture of phosphoric acid and mother liquors 47.5 kg of solid urea containing 46% N is added thereto. The temperature drops a few degrees as the result of the dissolution of the urea and then rises by about 12°C in proportion to the crystallization of the urea phosphate.

The paste obtained, with the crystals in suspension, is cooled to about 118°C and the crystals are then separated by centrifuging.

One-hundred kg of urea phosphate crystals and 136 kg of mother liquors are obtained, which corresponds to a crystallization yield of 79 percent.

Analyses of the crystals and mother liquors give the following contents:

|  | Crystals | Mother liquors |
|---|---|---|
| $P_2O_5$% | 44.40 | 21.47 |
| N% | 17.35 | 8.82 |
| F% | 0.07 | 0.70 |
| Mg% | 0.0215 | 0.2890 |
| Fe% | 0.0725 | 1.1500 |
| Al% | 0.0400 | 0.3700 |
| Ca% | 0.0023 | 0.0407 |
| Si% | 0.0100 | 0.0300 |

The 100 kg of urea phosphate crystals are delivered to the installation producing fertilizers based on urea-ammonium polyphosphate, in which they are treated as in Example 1

The mother liquors, amounting to 236 kg, are used to the extent of 76.7 percent, that is to say 181 kg, for recycling for the production of urea phosphate, and to the extent of 23.3 percent, that is to say 55 kg, for the production of fertilizers based on urea-ammonium orthophosphate.

These mother liquors, containing very considerable impurities, are concentrated from a $P_2O_5$ content of 21.47 to a $P_2O_5$ content of 29 percent and then ammoniated.

The resulting paste is delivered to a conventional granulation installation in which, as in Example 1, a recycling rate of twice the weight of a marketable product is maintained.

Thirty-three kg of binary fertilizer are obtained with the following titration:
total N : 21.61%
ureic N : 10.38%
ammonical N : 11.23%
total $P_2O_5$ : 35.58%
water soluble $P_2O_5$
and citrate : 35.38%
water soluble $P_2O_5$ : 29.82%

The high content of impurities, particularly Fe and Al, in the mother liquors leads to a binary fertilizer of which the titres differ from those of the binary fertilizer obtained under the same conditions in Example 1.

EXAMPLE 3

In this example the total amount (97 kg) of urea-ammonium polyphosphate obtained in accordance with Example 1 at the outlet of the reaction tube 7 is treated. This quantity is dissolved in the vessel by introducing into this dissolution vessel 68 kg of water, 25 kg of wet process phosphoric acid containing 53.5 percent of $P_2O_5$, and 4 kg of additional ammonia. There are finally obtained 194 kg of urea-ammonium polyphosphate liquor containing 14% N and 30% $P_2O_5$. The weight ratio N: $P_2O_5$ of this liquor is 0.466.

EXAMPLE 4

An urea-ammonium polyphosphate liquor obtained in accordance with the process indicated in Example 1 and titrating on analysis at 16% N and 29.5% N and 29.5% $P_2O_5$ is subjected to a temperature of −15°C for about 10 minutes so as to allow part of the urea to crystallize. After separation of this part by centrifuging, the centrifuged liquor has a titre of 13.7% N and 31.85% $P_2O_5$.

It is found that the weight ratio N:$P_2O_5$, which was 0.53 in the original liquor, has fallen to 0.43 in the centrifuged liquor.

I claim:

1. A process for the production of reaction products of phosphoric acid, urea, and ammonia by the conversion of phosphoric acid into urea phosphate and subsequent ammoniation of the urea phosphate, this process including stages in which: (1) urea and unpurified wet process phosphoric acid containing 30–60% of $P_2O_5$ are reacted directly with the formation of a urea phosphate, the urea phosphate crystallizing out and leaving in solution mineral impurities accompanying the phosphoric acid; and (2) at least one treatment of said urea phosphate with ammonia is carried out at a pressure at least equal to atmospheric pressure, the said at least one treatment with ammonia leading to the formation of an ammoniated polyphosphate product having a low degree of condensation and consisting of an ammonium polyphosphate the non-ortho $P_2O_5$ content of which constitutes at least 50 percent of its total $P_2O_5$ content; the combination of the reactions carried out in stages (1) and (2) providing an overall excess of heat.

2. A process as claimed in claim 1, wherein the urea reactant is selected from the group consisting of solid urea and concentrated solutions of urea.

3. A process as claimed in claim 1, wherein the ammonia reactant is selected from consisting of ammonia and liquid ammonia.

4. A process as claimed in claim 1, wherein the ammonium polyphosphate is principally ammonium pyrophosphate and the at least one treatment with ammonia is carried out at a temperature between 120° and 155°C.

5. A process as claimed in claim 4 wherein the process is operated under autothermic conditions.

6. A process as claimed in claim 1, wherein the said at least one treatment with ammonia leads to the formation of a product the non-ortho $P_2O_5$ content of which is from 50–70 percent of its total $P_2O_5$ content.

7. A process as claimed in claim 1, wherein an urea-ammonium polyphosphate based fertilizer is obtained by the addition, after the crystallization of urea phosphate and subsequent ammoniation thereof, of an amount of urea leading to the production of a solid binary fertilizer containing about 3% N and 30% $P_2O_5$.

8. A process as claimed in claim 7, wherein, by the addition also of potassium chloride, the product is modified to provide a solid ternary fertilizer containing about 20% N, 20% $P_2O_5$, 20% $k_2O$.

9. A process as claimed in claim 1, wherein a liquid fertilizer is obtained by dissolving the urea-ammonium polyphosphate formed in stage (2) in water, whereby a liquid fertilizer containing about 15 to 17% N and 27 to 31% $P_2O_5$ is provided.

10. A process as claimed in claim 1, wherein a liquid fertilizer is obtained by dissolving the urea-ammonium polyphosphate formed in stage (2) in water, and cooling the liquors obtained after dissolving the urea-ammonium polyphosphate in water to a temperature lower than $-5°C$.

11. A process as claimed in claim 1 wherein a liquid fertilizer is obtained by dissolving the urea-ammonium polyphosphate formed in stage (2) in water and introducing wet process phosphoric acid in the zone in which the urea-ammonium polyphosphate is dissolved.

12. A process as claimed in claim 10, wherein part of the urea is crystallized by cooling the urea-ammonium polyphosphate liquor to a temperature between $-10°$ and $-15°C$, and thereafter the urea and the desired urea-ammonium polyphosphate liquor are separated.

13. A process as claimed in claim 1, wherein the mother liquors left upon the separation of the urea phosphate crystals are concentrated and ammoniated, whereby the paste is obtained, and a solid binary fertilizer substantially containing 22-25% N and 35.5-36.5% $P_2O_5$ is produced by the granulation of material comprising the paste.

14. A process as claimed in claim 13, wherein potassium chloride and urea are added to the paste, whereby, after granulation, a solid ternary fertilizer containing about 19% N, 19% $P_2O_5$ and 19% $K_2O$ is produced.

* * * * *